US008906150B2

(12) United States Patent
Goredema et al.

(10) Patent No.: US 8,906,150 B2
(45) Date of Patent: Dec. 9, 2014

(54) PHASE CHANGE INKS CONTAINING CRYSTALLINE TRANS-CINNAMIC DIESTERS AND POLYTERPENE RESINS

(75) Inventors: Adela Goredema, Mississauga (CA); Rina Carlini, Oakville (CA); Caroline M. Turek, Mississauga (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/303,516

(22) Filed: Nov. 23, 2011

(65) Prior Publication Data
US 2013/0131226 A1 May 23, 2013

(51) Int. Cl.
| C08K 5/1545 | (2006.01) |
| C08K 5/1535 | (2006.01) |
| C08K 5/20 | (2006.01) |
| C08K 5/12 | (2006.01) |
| C09D 11/02 | (2014.01) |
| C09D 11/10 | (2014.01) |
| C09D 11/34 | (2014.01) |
| C09D 11/38 | (2014.01) |
| C09D 11/102 | (2014.01) |

(52) U.S. Cl.
CPC .............. *C09D 11/102* (2013.01); *C09D 11/34* (2013.01); *C09D 11/38* (2013.01)
USPC ....... 106/31.13; 106/31.29; 524/57; 524/299; 524/111; 524/210

(58) Field of Classification Search
None
See application file for complete search history.

(56) References Cited

U.S. PATENT DOCUMENTS

| 3,235,557 A | 2/1966 | Wiggins et al. |
| 3,308,024 A | 3/1967 | Wiggins et al. |
| 4,153,566 A | 5/1979 | Ryer et al. |
| 4,169,836 A | 10/1979 | Ryer et al. |
| 5,173,113 A * | 12/1992 | Sugerman et al. ......... 106/31.35 |
| 5,698,017 A | 12/1997 | Sacripante et al. |
| 5,817,169 A | 10/1998 | Sacripante et al. |
| 6,306,203 B1 * | 10/2001 | Malhotra et al. ............ 106/31.29 |
| 6,797,745 B1 * | 9/2004 | Malhotra ....................... 523/160 |
| 2006/0269824 A1 * | 11/2006 | Hampden-Smith et al. .... 429/40 |
| 2013/0032056 A1 * | 2/2013 | Goredema et al. ......... 106/31.29 |

OTHER PUBLICATIONS

Jennifer Belelie et al., U.S. Appl. No. 13/095,636.
Rina Carlini et al., U.S. Appl. No. 13/196,157.
Adela Goredema et al., U.S. Appl. No. 13/196,227.
Rina Carlini et al., U.S. Appl. No. 13/095,174.
Rina Carlini et al., U.S. Appl. No. 13/095,221.
Kentaro Morimitsu et al., U.S. Appl. No. 13/095,795.
Paul McConville et al., U.S. Appl. No. 13/095,038.
Naveen Chopra et al., U.S. Appl. No. 13/095,555.
Jennifer L. Belelie et al., U.S. Appl. No. 13/095,591.
Kentaro Morimitsu et al., U.S. Appl. No. 13/095,784.
Kentaro Morimitsu et al., U.S. Appl. No. 13/095,715.
Kentaro Morimitsu et al., U.S. Appl. No. 13/095,770.
Jennifer L. Belelie et al., U.S. Appl. No. 13/095,681.
Thomas Edward Enright et al., U.S. Appl. No. 13/095,015.
Kentaro Morimitsu et al., U.S. Appl. No. 13/095,028.
Rina Carlini et al., U.S. Appl. No. 13/196,691.
R. H Wiley and L. L. Bennett, Chemical Reviews, vol. 44, pp. 447-476 (1949).
J. W. Cornforth, Heterocyclic Compounds, 1957, chapter 5, pp. 300-417.
A.I. Meyers and D.L. Temple, Journal of the American Chemical Society, vol. 92, p. 6644 (1970).
Garrett C. Moraski et al., European Journal of Medicinal Chemistry, 45, (2010), 1703-1716.
H. L. Wehrmeister, Journal of Organic Chemistry, vol. 27, pp. 4418-4420 (1962).
P. Allen and J. Ginos, Journal of Organic Chemistry, vol. 28, pp. 2759-2762 (1963).
Y. Chujo, K. Sada, and T. Saegusa, Macromolecules 1990, 23, 2636-2641.

* cited by examiner

*Primary Examiner* — Yun Qian

(74) *Attorney, Agent, or Firm* — Pillsbury Winthrop Shaw Pittman LLP

(57) ABSTRACT

Disclosed is a phase change ink comprising an ink carrier which comprises: (a) a crystalline trans-cinnamic diester; and (b) an amorphous polyterpene resin.

20 Claims, 1 Drawing Sheet

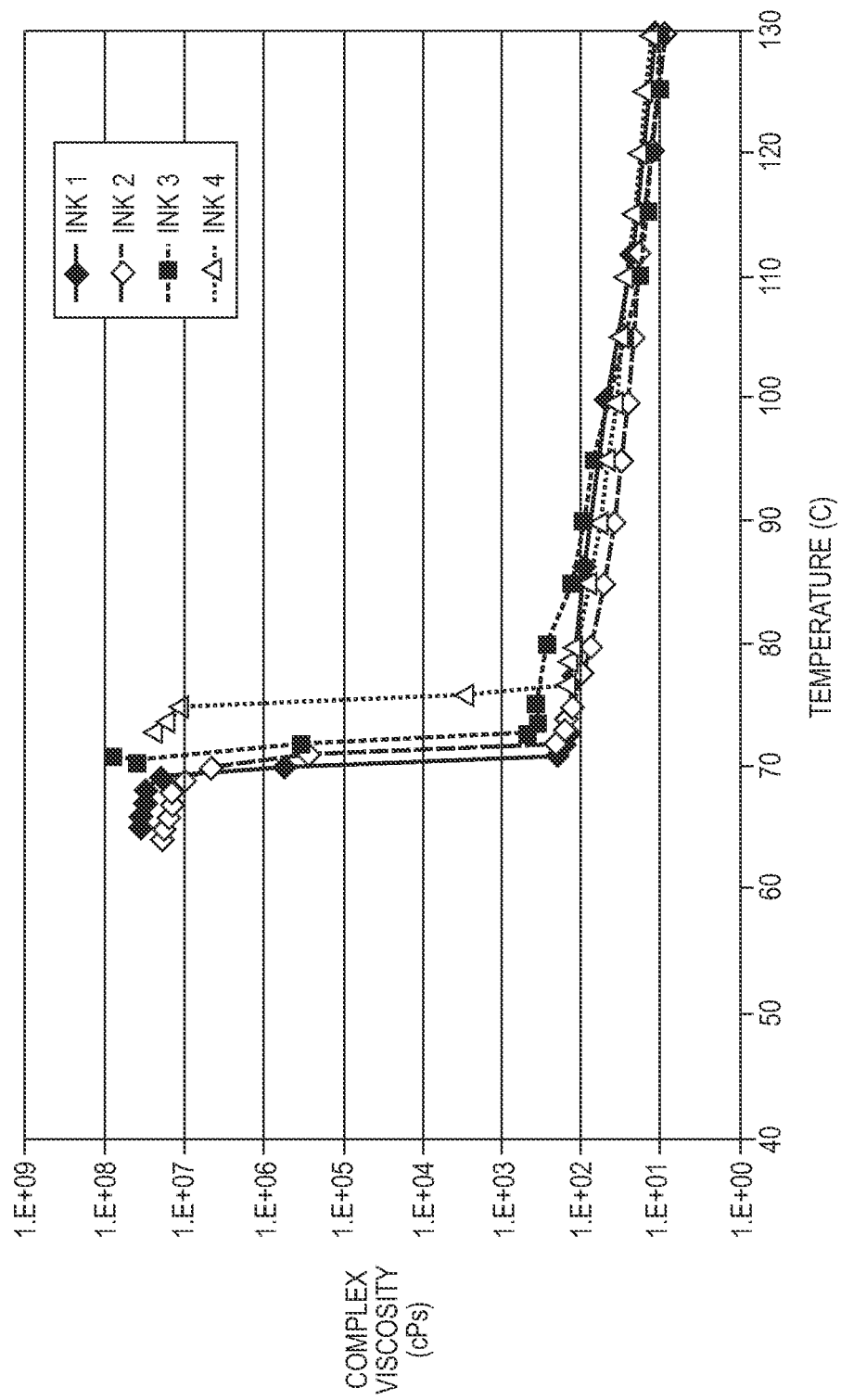

PHASE CHANGE INKS CONTAINING CRYSTALLINE TRANS-CINNAMIC DIESTERS AND POLYTERPENE RESINS

CROSS-REFERENCE TO RELATED APPLICATIONS

Reference is made to U.S. application Ser. No. 13/095,636, filed Apr. 27, 2011, entitled "Solid Ink Compositions Comprising Crystalline-Amorphous Mixtures," with the named inventors Jennifer L. Belelie, Peter G. Odell, Stephan V. Drappel, Kentaro Morimitsu, Naveen Chopra, Marcel P. Breton, Gabriel Iftime, C. Geoffrey Allen, and Rina Carlini, the disclosure of which is totally incorporated herein by reference.

Reference is made to U.S. application Ser. No. 13/196,157, filed Aug. 2, 2011, entitled "Phase Change Inks Containing Oxazoline Compounds and Polyterpene Resins," with the named inventors Rina Carlini, Adela Goredema, Guerino G. Sacripante, Caroline M. Turek, and Edward G. Zwartz, the disclosure of which is totally incorporated herein by reference.

Reference is made to U.S. application Ser. No. 13/196,227, filed Aug. 2, 2011, entitled "Phase Change Inks Containing Crystalline Trans-Cinnamic Diesters and Amorphous Isosorbide Oligomers," with the named inventors Adela Goredema, Rina Carlini, Caroline M. Turek, Guerino G. Sacripante, and Edward G. Zwartz, the disclosure of which is totally incorporated herein by reference.

BACKGROUND

Disclosed herein are phase change ink compositions. More specifically, disclosed herein are phase change inks containing crystalline trans-cinnamic acid derived diesters and amorphous polyterpene resins.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, or the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Known phase change inks generally contain components such as crystalline waxes and other materials that enable sharp and rapid phase transitions from the molten liquid state to the solid state. Many known phase change inks, however, exhibit disadvantages such as poor adhesion to coated paper substrates, resulting in poor scratch-resistance, poor image robustness, hard and brittle properties, poor 'paper fold' performance such as cracking and creasing of the image when the document is folded, and document offset. Further, the nonpolarity of these ink components often leads to compatibility issues with commonly available dyes and pigments, resulting in the need for more expensive or custom-designed colorants to ensure good solubility or dispersibility in the ink carrier and good long-term thermal stability to prevent colorant degradation or colorant migration. Additionally, many known phase change inks generate prints that do not accept writing from pens.

Customers have also created a demand for materials that are bio-based, or derived at least partly from renewable resources. Energy and environmental policies, increasing and volatile oil prices, and public/political awareness of the rapid depletion of global fossil reserves has created a need to find sustainable monomers derived from biomaterials. By using bio-renewable feedstock, manufacturers can reduce their carbon footprint and move to a zero-carbon or even a carbon-neutral footprint. Bio-based polymers can also be very attractive in terms of specific energy and emission savings. Using bio-based feedstock can help provide new sources of income for domestic agriculture and reduce the economic risks and uncertainty associated with reliance on petroleum imported from unstable regions.

Accordingly, while known materials and processes are suitable for their intended purposes, there is a need for improved phase change inks. In addition, there is a need for phase change inks that exhibit sharp and rapid phase transitions from the molten liquid state to the solid state. Further, there is a need for phase change inks that exhibit good adhesion to coated paper substrates. Additionally, there is a need for phase change inks that exhibit good scratch-resistance. There is also a need for phase change inks that exhibit good image robustness. In addition, there is a need for phase change inks that exhibit good "paper fold" performance and reduced cracking and creasing of the image when the document is folded. Further, there is a need for phase change inks that exhibit good document offset performance. Additionally, there is a need for phase change inks that exhibit good compatibility with commonly available colorants. In addition, a need remains for phase change inks that contain at least some materials at least partly derived from bio-based or renewable resources. Further, a need remains for phase change inks that can be prepared at desirably low cost. Additionally, a need remains for phase change inks that generate prints which accept writing from pens. There is also a need for phase change inks that contain some biodegradable components.

SUMMARY

Disclosed herein is a phase change ink comprising an ink carrier which comprises: (a) a crystalline trans-cinnamic diester; and (b) an amorphous polyterpene resin. Also disclosed herein is a phase change ink comprising: (1) an ink carrier comprising: (a) a crystalline trans-cinnamic diester in an amount of from about 50 to about 95 percent by weight; and (b) an amorphous polyterpene resin in an amount of from about 5 to about 50 percent by weight; and (2) a colorant. Further disclosed herein is a phase change ink comprising: (1) an ink carrier comprising: (a) a crystalline trans-cinnamic diester in an amount of from about 50 to about 95 percent by weight, said trans-cinnamic diester being of the formula

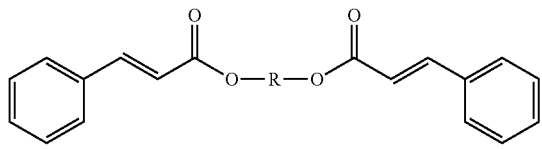

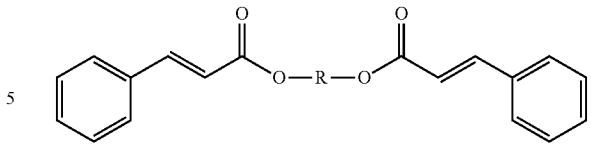

wherein R is: (i) an alkylene group, including substituted and unsubstituted alkylene groups, and wherein hetero atoms either may or may not be present in the alkylene group; (ii) an arylene group, including substituted and unsubstituted arylene groups, and wherein hetero atoms either may or may not be present in the arylene group; (iii) an arylalkylene group, including substituted and unsubstituted arylalkylene groups, and wherein hetero atoms either may or may not be present in either or both of the alkyl portion and the aryl portion of the arylalkylene group; or (iv) an alkylarylene group, including substituted and unsubstituted alkylarylene groups, and wherein hetero atoms either may or may not be present in either or both of the alkyl portion and the aryl portion of the alkylarylene group; wherein two or more substituents can be joined together to form a ring; and (b) an amorphous polyterpene resin in an amount of from about 5 to about 50 percent by weight, said polyterpene resin containing monomers selected from alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof; and (2) a colorant.

BRIEF DESCRIPTION OF THE DRAWINGS

FIG. 1 is a plot of complex viscosity vs. temperature for the inks prepared in the working examples.

DETAILED DESCRIPTION

Ink Components

The inks disclosed herein contain a crystalline trans-cinnamic acid derived diester. Trans-cinnamic acid is a natural material found in oil of cinnamon, or in balsams such as storax or shea butter. Trans-cinnamic acid can also be derived from the natural amino-acid phenylalanine using the enzyme phenylalanine ammonia-lyase. Different diols of the formula HO—R—OH can be reacted with trans-cinnamic acid to give di-esters.

Examples of suitable trans-cinnamic diesters include (but are not limited to) those of the formula wherein R is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, or the like either may or may not be present in the alkylene group, in one embodiment with at least about 2 carbon atoms, in another embodiment with at least about 3 carbon atoms, and in yet another embodiment with at least about 4 carbon atoms, and in one embodiment with no more than about 20 carbon atoms, in another embodiment with no more than about 10 carbon atoms, and in yet another embodiment with no more than about 8 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, or the like either may or may not be present in the arylene group, in one embodiment with at least about 6 carbon atoms, in another embodiment with at least about 7 carbon atoms, and in yet another embodiment with at least about 8 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylarylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents on the substituents on the substituted alkylene, arylene, arylalkylene, and alkylarylene groups can be (but are not limited to) hydroxy groups, halogen atoms, ammonium groups, pyridine groups, pyridinium groups, ether groups, aldehyde groups, ketone groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, isothiocyanato groups, carboxylate groups, carboxylic acid groups, urethane groups, urea groups, mixtures thereof, or the like, wherein two or more substituents can be joined together to form a ring.

Specific examples of suitable trans-cinnamic acid derived diesters include (but are not limited to) propane-1,3-trans-cinnamate, of the formula

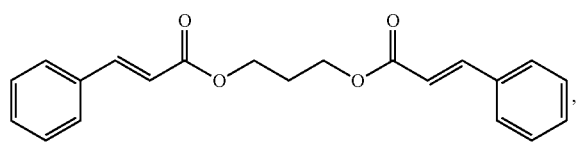 [SMILES: O=C(/C=C/c1ccccc1)OCCCOC(=O)/C=C/c1ccccc1]

butane-1,4-trans-cinnamate, of the formula

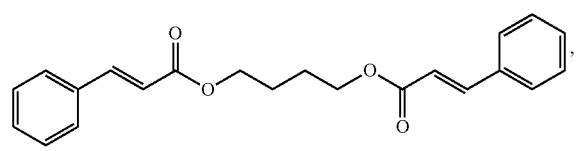 [SMILES: O=C(/C=C/c1ccccc1)OCCCCOC(=O)/C=C/c1ccccc1]

hexane-1,6-trans-cinnamate, of the formula

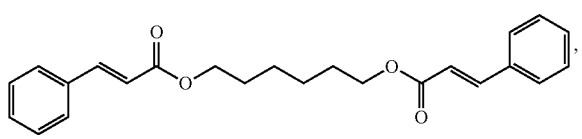 [SMILES: O=C(/C=C/c1ccccc1)OCCCCCCOC(=O)/C=C/c1ccccc1]

trans-cyclohexane-1,4-dimethanol-trans-cinnamate, of the formula

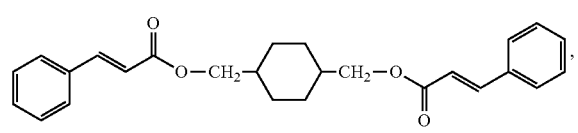 [SMILES: O=C(/C=C/c1ccccc1)OCC1CCC(COC(=O)/C=C/c2ccccc2)CC1]

para-phenyl-1,4-dimethanol-trans-cinnamate, of the formula

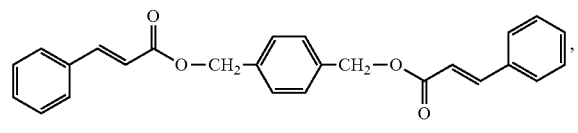 [SMILES: O=C(/C=C/c1ccccc1)OCc1ccc(COC(=O)/C=C/c2ccccc2)cc1]

bis(hydroxymethyl)furan-trans-cinnamate, of the formula

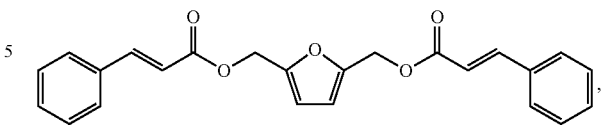

2,5-dihydroxymethyl-tetrahydrofuran-trans-cinnamate, of the formula

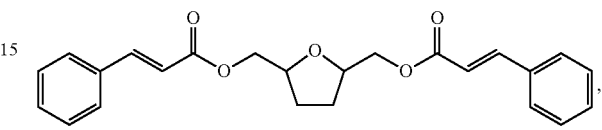

trans-cinnamic acid-2,3-butanediol diester, of the formula

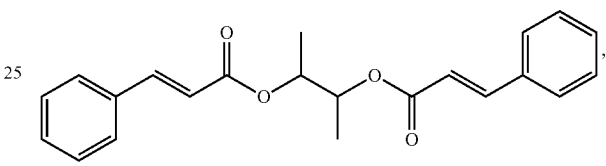

or the like, as well as mixtures thereof.

In one specific embodiment, the diol is selected to be derived from a bio-based or renewable resource. Products can be tested for whether they are sourced from petroleum or from renewable resources by $^{14}C$ radiocarbon dating. Products sourced from petroleum will have substantially high $^{14}C$ radiocarbon dating values, in the millions of years, compared to very recent or present day radiocarbon values for those products derived from renewable resources. Examples of suitable bio-based diols include, but are not limited to, 1,4-butanediol, 1,3-propadediol, 2,3-butanediol, or the like, as well as mixtures thereof, which can be obtained from sugars. In this manner, the entire trans-cinnamic diester material can be selected to be bio-based.

The trans-cinnamic diester is present in the ink carrier in any desired or effective amount, in one embodiment at least about 50 percent by weight, in another embodiment at least about 60 percent by weight, and in yet another embodiment at least about 70 percent by weight, and in one embodiment no more than about 95 percent by weight, in another embodiment no more than about 90 percent by weight, and in yet another embodiment no more than about 85 percent by weight, although the amount can be outside of these ranges.

The inks disclosed herein also contain an amorphous polyterpene resin. Polyterpene resins are those obtained by polymerization of unsaturated monoterpene compounds, such as alpha-pinene, beta-pinene, d-limonene, or the like, as well as mixtures thereof, all of which are derived from renewable resources.

Monoterpene compounds are 10-carbon compounds belonging to the terpenoid family of natural products, which are biosynthesized naturally in plant and animal sources from two types of 5-carbon building block compounds, isopentenyl pyrophosphate (IPP) and dimethylallyl pyrophosphate (DMAPP). The biosynthetic pathway which produces the monoterpene compounds (also known as the mevalonic acid pathway) involves the 'head-to-tail' cationic addition of IPP with DMAPP, which is catalyzed enzymatically with involvement of adenosine triphosphate (ATP) equilibria. The product formed in the addition of IPP with DMAPP is geranyl pyrophosphate (GPP), which can go on to add further IPP and DMAPP building units, thereby producing larger terpenoid compounds, including the sesquiterpenes (C15 compounds), the diterpenes (C20 compounds, such as for example the rosin family of abietic acid derivatives), sesterterpenes (C25 compounds), and the well-known triterpene (C30 compounds, which include squalene, cholesterol, progesterone, and other sterols and steroid compounds). Alternatively, the C10 building block GPP (geranyl pyrophosphate) can undergo intramolecular cyclization to provide functional and fragrant monoterpene compounds that include mono-unsaturated pinenes (alpha, beta isomers), limonene, camphenes, and bornenes.

In specific embodiments, the polyterpene resins can be either homopolymers or copolymers of unsaturated monoterpenes, such as alpha-pinene, beta-pinene, d-limonene, mixtures of alpha/beta-pinenes or the like, and blended combinations thereof. In other specific embodiments, the polyterpene resins can also be copolymers of unsaturated monoterpenes such as alpha-pinene, beta-pinene, d-limonene, or the like, with other ethylenically unsaturated conventional monomers that are petroleum-based, such as styrene, alpha-methylstyrene, alkyl acrylates, alkyl methacryates, vinyl alkanoates such as vinyl acetate, vinyl butyrate or the like, ethylene vinyl acetate, styrene-maleic anhydride, and similar monomers.

Examples of suitable polyterpene resins include (but are not limited to) homopolymers and copolymers of α-pinene, β-pinene, limonene, norbornene, myrcene, phellandrene, car-

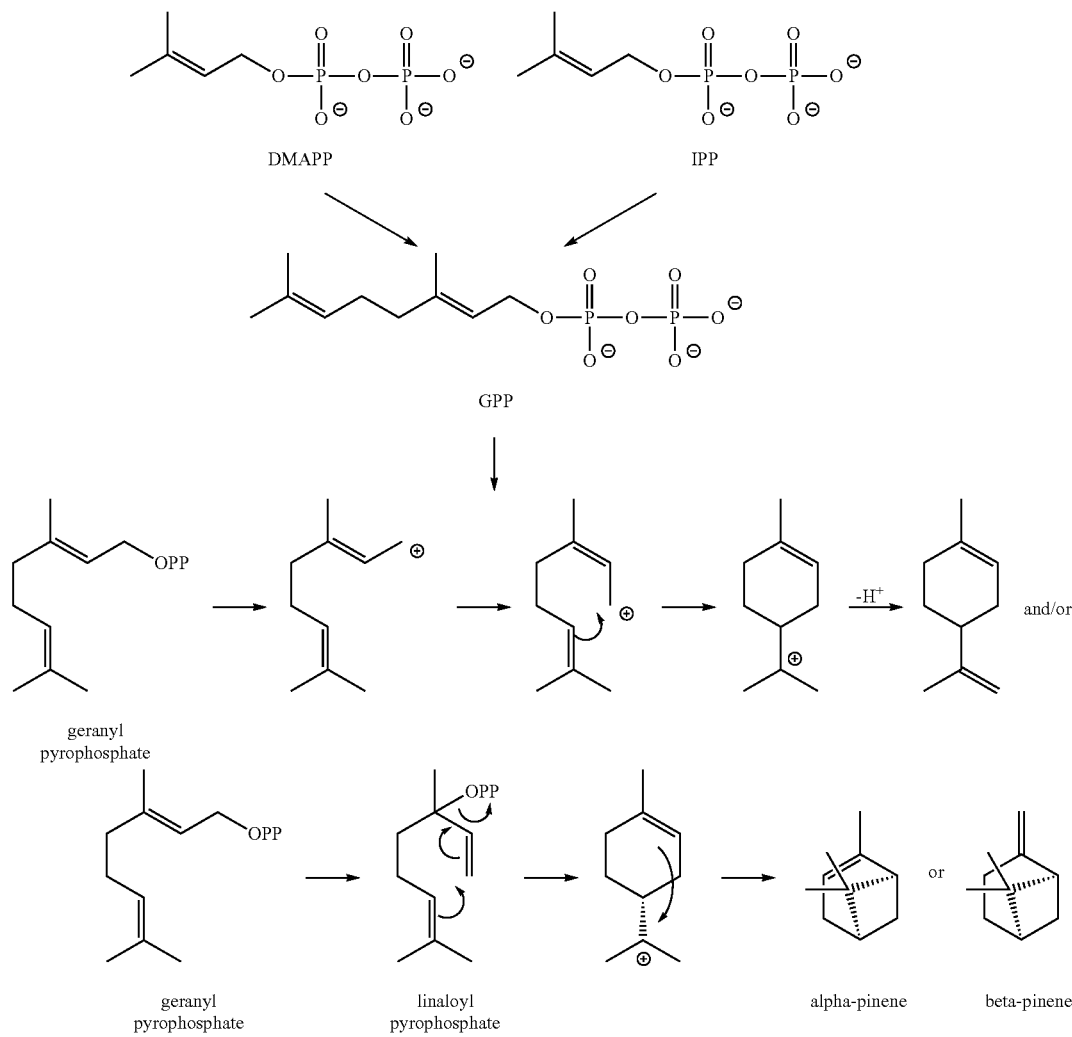

Oxidation of these unsaturated compounds leads to well-known fragrant monoterpenes such as menthol, geraniol, eucaplyptol, perilla alcohol, and camphor. Details about the biosynthesis and properties of the terpenoid family of natural products are fully described in, for example, P. M. Dewick, *Medicinal Natural Products: A Biosynthetic Approach* (2002, Wiley), the disclosure of which is totally incorporated herein by reference.

vone, camphene, 2-carene, 3-carene, perillyl alcohol, perillyl aldehyde, perillic acid, alkyl, aryl, arylalkyl, and alkylaryl esters of perillyl alcohol or perillyl acid, α-ionone, β-ionone, γ-terpinene, β-citronellene, β-citronellol, citronellal, citronellic acid, alkyl, aryl, arylalkyl, and alkylaryl esters of β-citronellol or citronellic acid, geraniol, geranial, alkyl, aryl, arylalkyl, and alkylaryl esters of geraniol, such as geranyl benzoate or the like, linalool, alkyl, aryl, arylalkyl, and alky laryl esters of linalool, nerolidol, alkyl, aryl, arylalkyl, and alkylaryl esters of nerolidol, such as nerolidyl acetate or the like, verbenol, verbenone, alkyl, aryl, arylalkyl, and alkylaryl esters of verbenol, and blended mixtures of the homopolymers or copolymers. The alkyl, aryl, arylalkyl, and alkylaryl esters include those wherein alkyl includes linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 1 carbon atom, and in another embodiment with at least about 2 carbon atoms, and in one embodiment with no more than about 20 carbon atoms, and in another embodiment with no more than about 18 carbon atoms, although the number of carbon atoms can be outside of these ranges; aryl includes substituted and unsubstituted aryl groups, and wherein hetero atoms, such as oxygen, nitrogen, sulfur, silicon, phosphorus, boron, or the like either may or may not be present in the aryl group, in one embodiment with at least about 5 carbon atoms, and in another embodiment with at least about 6 carbon atoms, and in one embodiment with no more than about 24 carbon atoms, in another embodiment with no more than about 18 carbon atoms, and in yet another embodiment with no more than about 14 carbon atoms, although the number of carbon atoms can be outside of these ranges, such as phenyl or the like; arylalkyl includes substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as benzyl or the like; alkylaryl includes substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as tolyl or the like; and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, or the like, wherein two or more substituents can be joined together to form a ring. Other examples of suitable polyterpene compounds include copolymers of unsaturated monoterpenes with conventional petroleum-based ethylenically unsaturated monomers, such as for example, styrene, alpha-methylstyrene, alkyl acrylates (with alkyl as defined in this paragraph), alkyl methacryates (with alkyl as defined in this paragraph), vinyl alkanoates (with alkyl as defined in this paragraph), such as vinyl acetate, vinyl butyrate or the like, ethylene vinyl acetate, styrene-maleic anhydride, and similar monomers.

The polyterpene resins for the inks disclosed herein are commonly random copolymers, but can also include block copolymers or grafted copolymers prepared by methods suitable for either block copolymer synthesis or for chemically grafting other copolymer segments. In a specific embodiment, the polyterpene resin is a random copolymer prepared from a mixture of α-pinene, β-pinene, β-phellandrene, and other ethylenically unsaturated monomers such as dipentene or isoprene or limonene. In the polyterpene resins of embodiments prepared from mixtures of α-pinene and β-pinene monomers, the molar ratio of α- to β-pinene monomer can range from about 5% to about 80% of the total pinene monomer mixture. In further embodiments, the amount of total α/β-pinene monomers used to prepare the polyterpene resins can be in the range of from about 50 mole-% to about 100 mole-% of total monomers used, although the amount can also be outside of this range.

The weighted-average molecular weight (Mw) of the polyterpene resins can be of any suitable amount that is useful for a particular ink formulation. In specific embodiments, the value is such as to provide an ink composition that has good jetting viscosity at higher temperature of about 9 to 12 centipoise (cPs). In one specific embodiment, the Mw value for the polyterpene resins (determined by gel-permeation chromatography methods and measured against polystyrene calibration standards) in g/mole is at least about 2,000, in another embodiment at least about 5,000, and in yet another embodiment at least about 7,000, and in one embodiment no more than about 50,000, in another embodiment no more than about 30,000, and in yet another embodiment no more than about 20,000, although the value can be outside of these ranges.

The polyterpene resins suitable for the inks disclosed herein are amorphous materials. In specific embodiments, the polyterpene resins have a pale color and have values less than about 5 on the Gardner scale when measured as a 50 wt % solution in organic solvent by colorimetry (tintometer instrument). The polyterpene resins have glass transition onset temperatures (Tg) in one embodiment of at least about 10° C., and one embodiment of no more than about 60° C., although the value can be outside of this range, and endpoint Tg values of in one embodiment of at least about 20° C., and in one embodiment of no more than about 75° C., although the value can be outside of this range. Furthermore, the polyterpene resins have softening points (measured by the ring and ball method) of in one embodiment at least about 30° C., in another embodiment at least about 40° C., and in yet another embodiment at least about 50° C., and in one embodiment no more than about 130° C., in another embodiment no more than about 125° C., and in yet another embodiment no more than about 120° C., although the value can be outside of these ranges.

In one specific embodiment, some polyterpene resins can exhibit rheological properties of amorphous polymers as illustrated in the table below. The PICCOLYTE® polyterpene resin examples shown exhibit complex viscosities measured at 1 Hz frequency and at temperatures above 130° C.

that range from about 200 cPs to about 20,000 cPs. At temperatures lower than about 100° C., the complex viscosities measured at 1 Hz for these resins were significantly higher and ranging from about $1 \times 10^5$ cPs to about $5 \times 10^9$ cPs. In addition, the polyterpene resins exhibited "Newtonian" rheological behavior, in that the complex viscosity measured at temperatures above 130° C. did not change significantly under different applied shear frequencies (ranging from about 0.1 Hz to about 16 Hz). These viscosity properties were found to be suitable for use as amorphous binder resins in phase change ink formulations when combined with a crystalline phase-change agent or viscosity-modifying component.

Rheology profiles of three suitable commercially available polyterpene resins were measured using the Rheometrics RFS3 strain-controlled rheometer and the results are shown in the table below. Complex viscosity was measured across a dynamic temperature sweep of 140° C. to about 75° C. using a Rheometrics RFS3 instrument equipped with 25 mm parallel plate geometry tool, set at constant frequency of 1 Hz and under constant 100% applied strain.

| Temperature | Complex Viscosity (cPs)* | | |
| --- | --- | --- | --- |
| (° C.) | Piccolyte ® F105 | Piccolyte ® F90 | Piccolyte ® S-85 |
| 140 | 6878 | 1374 | 466 |
| 135 | 12081 | 2250 | 656 |
| 130 | 22160 | 3844 | 971 |
| 125 | 42335 | 6895 | 1492 |
| 120 | 86630 | 12966 | 2353 |
| 115 | 186236 | 26242 | 3904 |
| 110 | 436821 | 55129 | 6849 |
| 105 | 1096000 | 129719 | 12755 |
| 100 | 3023294 | 320089 | 24320 |
| 95 | 7979134 | 813184 | 50656 |
| 90 | — | 2228871 | 112470 |
| 85 | — | 5768318 | 255240 |
| 80 | — | — | 643621 |
| 75 | — | — | 1575535 |

— indicates not measured

Examples of suitable amorphous polyterpene resins include the commercial PICCOLYTE® series of resins available from Pinova Solutions (USA), such as PICCOLYTE® S25 and S85 (3-pinene resin prepared from β-pinene), PICCOLYTE® F90 and F105 (α-pinene/β-pinene copolymer resin prepared from α-pinene/β-pinene monomer mixtures), and PICCOLYTE® C105 (limonene resin prepared from limonene monomers). Other suitable polyterpene resins include the SYLVAGUM™ TR90 and TR105 resins, and SYLVARES™ ZT106 resins available from Arizona Chemical (USA).

Polyterpenes are particularly desirable ink components because they have good thermal stability and elastomeric properties suitable for phase change printing inks, and because they are obtained from bio-based or renewable sources.

The amorphous polyterpene resin is present in the ink carrier in a total amount in any desired or effective amount, in one embodiment at least about 5 percent by weight, in another embodiment at least about 10 percent by weight, in yet another embodiment at least about 15 percent by weight, and in still another embodiment at least about 20 percent by weight, and in one embodiment no more than about 50 percent by weight, in another embodiment no more than about 40 percent by weight, in yet another embodiment no more than about 35 percent by weight, and in still another embodiment no more than about 30 percent by weight, although the amount can be outside of these ranges.

Colorants

The ink compositions can also contain an optional colorant Any desired or effective colorant can be employed in the ink compositions, including dyes, pigments, mixtures thereof, or the like. Any dye or pigment can be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, or the like. Examples of suitable dyes include Neozapon Red 492 (BASF); Orasol Red G (BASF); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (BASF); Orasol Black CN (BASF); Savinyl Black RLSN(Clariant); Pyrazol Black BG (Clariant); Morfast Black 101 (Rohm & Haas); Diazol Black RN (ICI); Orasol Blue GN (BASF); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, or the like. Other suitable dyes include those disclosed in U.S. Patent Application Publication No. 2010/0086683 and U.S. Pat. Nos. 7,732,581; 7,381,831; 6,713,614; 6,646,111; 6,590,082; 6,472,523; 6,713,614; 6,958,406; 6,998,493; 7,211,131; and 7,294,730, the disclosures of each of which are totally incorporated herein by reference. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In some embodiments, solvent dyes are employed. Examples of suitable solvent dyes include Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195](BASF), Sudan Blue 670 [C.I. 61554](BASF), Sudan Yellow 146 [C.I. 12700](BASF), Sudan Red 462 [C.I. 260501](BASF), or the like.

Pigments are also suitable colorants for the inks described herein. Examples of suitable pigments include PALIOGEN Violet 5100 (BASF); PALIOGEN Violet 5890 (BASF);

HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (Du Pont); PALIOGEN Black L0084 (BASF); Pigment Black K801 (BASF); and carbon blacks such as REGAL 330™ (Cabot), Nipex 150 (Degussa) Carbon Black 5250 and Carbon Black 5750 (Columbia Chemical), or the like. Other suitable pigments include those disclosed in U.S. Pat. Nos. 7,905,954; 7,503,973; 7,465,348; and 7,427,323, the disclosures of each of which are totally incorporated herein by reference.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275, 647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

Mixtures of two or more dyes, two or more pigments, and one or more dyes with one or more pigments can also be used.

The ink can also contain one or more dispersants and/or one or more surfactants for their known properties, such as for controlling wetting properties of the pigments in the ink composition. Examples of suitable additives include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 13000, 13240, 17000, 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries). When present, the optional additives may each, or in combination, be present in the ink in any desired or effective amount, in one embodiment at least about 0.1 percent by weight of the ink, and in another embodiment at least about 0.5 percent by weight of the ink, and in one embodiment no more than about 15 percent by weight of the ink, and in another embodiment no more than about 12 percent by weight of the ink, although the amount can be outside of these ranges.

The colorant is present in any desired or effective amount to obtain the desired color or hue, in one embodiment at least about 0.5 percent by weight of the ink, in another embodiment at least about 1 percent by weight of the ink, and in yet another embodiment at least about 2 percent by weight of the ink, and in one embodiment no more than about 30 percent by weight of the ink, in another embodiment no more than about 20 percent by weight of the ink, in yet another embodiment no more than about percent by weight of the ink, in still another embodiment no more than about 12 percent by weight of the ink, and in yet another embodiment no more than about 10 percent by weight of the ink, although the amount can be outside of these ranges.

Additional Ink Additives

Additional optional components can be contained in the ink, such as viscosity modifiers, which are suitably low-melting and preferably crystalline compounds that have low melt viscosities so as to enable the phase change ink to have a low viscosity for inkjet printing. Crystalline viscosity modifiers can have melting temperatures of in one embodiment at least about 40° C., in another embodiment at least about 50° C., and in yet another embodiment at least about 55° C., and in one embodiment no more than about 100° C., in another embodiment no more than about 95° C., and in yet another embodiment no more than about 90° C., although the temperature can be outside of these ranges. The melt viscosities of suitable viscosity modifiers for use in the inks disclosed herein are in one embodiment at least about 3 cPs, in another embodiment at least about 4 cPs, and in yet another embodiment at least about 5 cPs, and in one embodiment no more than about 12 cPs, in another embodiment no more than about 10 cPs, and in yet another embodiment no more than about 9.5 cPs, although the value can be outside of these ranges. Examples of suitable viscosity modifiers for the phase change ink include, but are not limited to, pentaerythritol esters, such as pentaerythritol tetrastearate, pentaerythritol tetrabenzoate, or the like, sorbitol esters, including sorbitan tristearate esters or the like, such as SPAN 65, SPAN 60, SPAN 85, SPAN 40, or the like, available from Sigma-Aldrich Fine Chemicals Inc., Milwaukee, Wis., stearyl stearamide (also known as KEMAMIDE S180 available from Chemtura Corp., USA), erucamide, stearone, sucrose tetrastearate, sucrose tetrastearate triacetate (commercially available as SISTERNA A10E-C), linear alkyl cinnamate esters, esters of the general formula

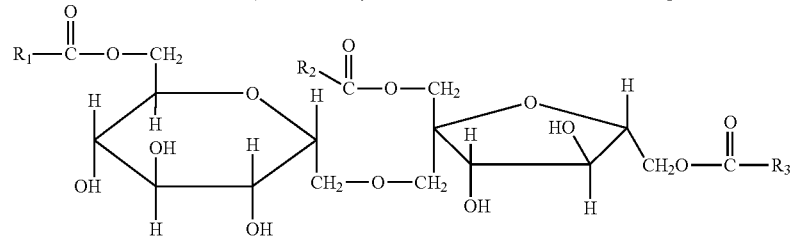

wherein $R_1$, $R_2$, and $R_3$ each, independently of the others, are hydrogen atoms or alkyl chains derived from saturated fatty acids (such as palmitic acid or the like), or the like, as well as mixtures thereof, in the ink composition in amounts of in one embodiment at least about 0.5 percent by weight, in another embodiment at least about 1 percent by weight, and in yet another embodiment at least about 2 percent by weight, and in one embodiment no more than about 15 percent by weight, in another embodiment no more than about 12 percent by weight, and in yet another embodiment no more than about 10 percent by weight, although the amount can be outside of these ranges.

In some embodiments, the ink can optionally contain antioxidants to protect the images from oxidation and also to protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (Aldrich 46, 852-5), (6) pentaerythritol tetrastearate (TCI America #P0739), (7) tributylammonium hypophosphite (Aldrich 42,009-3), (8) 2,6-di-tert-butyl-4-methoxyphenol (Aldrich 25, 106-2), (9) 2,4-di-tert-butyl-6-(4-methoxybenzyl)phenol (Aldrich 23,008-1), (10) 4-bromo-2,6-dimethylphenol (Aldrich 34, 951-8), (11) 4-bromo-3,5-didimethylphenol (Aldrich B6,420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4,680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26,003-7), (21) $\alpha,\alpha,\alpha$-trifluoro-o-cresol (Aldrich 21, 979-7), (22) 2-bromo-4-fluorophenol (Aldrich 30, 246-5), (23) 4-fluorophenol (Aldrich F1,320-7), (24) 4-chlorophenyl-2-chloro-1,1,2-tri-fluoroethyl sulfone (Aldrich 13, 823-1), (25) 3,4-difluoro phenylacetic acid (Aldrich 29,043-2), (26) 3-fluorophenylacetic acid (Aldrich 24, 804-5), (27) 3,5-difluoro phenylacetic acid (Aldrich 29,044-0), (28) 2-fluorophenylacetic acid (Aldrich 20, 894-9), (29) 2,5-bis (trifluoromethyl)benzoic acid (Aldrich 32, 527-9), (30) ethyl-2-(4-(4-(trifluoromethyl)phenoxy)phenoxy) propionate (Aldrich 25,074-0), (31) tetrakis(2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43,071-4), NAUGARD 76, NAUGARD 445, NAUGARD 512, and NAUGARD 524 (manufactured by Chemtura Corporation), or the like, as well as mixtures thereof. The antioxidant, when present, can be present in the ink in any desired or effective amount, in one embodiment at least about 0.25 percent by weight of the ink, and in another embodiment at least about 1 percent by weight of the ink, and in one embodiment no more than about 10 percent by weight of the ink, and in another embodiment no more than about 5 percent by weight of the ink, although the amount can be outside of these ranges.

The ink can further contain an optional tackifier in addition to the polyterpene resins, such as the commercial derivatives of rosin acids derived from gum rosins or tall oil resins. Representative examples include, but are not limited to, a glycerol ester of hydrogenated abietic (rosin) acid such as FORAL 85 (commercially available from Eastman), a pentaerythritol ester of hydroabietic (rosin) acid such as FORAL 105 (commercially available from Eastman), CELLOLYN 21, a hydroabietic (rosin) alcohol ester of phthalic acid (commercially available from Eastman), triglycerides of hydrogenated abietic (rosin) acid such as KE-311 and KE-100 resins, (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), or the like, as well as mixtures thereof. Tackifiers can be present in the ink in any desired or effective amount, in one embodiment at least about 0.01 percent by weight of the ink, in another embodiment at least about 0.1 percent by weight of the ink, and in yet another embodiment at least about 0.5 percent by weight of the ink, and in one embodiment no more than about 20 percent by weight of the ink, in another embodiment no more than about 17 percent by weight of the ink, and in yet another embodiment no more than about 15 weight percent of the ink, although the amount can be outside of these ranges.

The term "ink carrier", as used herein, refers to those components of the ink other than the colorant or mixture of colorants.

In one embodiment, the ink carrier (defined as that portion of the ink other than the colorant and other minor additives such as antioxidants and the like) has a BRC of at least 10%, in another embodiment at least 12%, and in yet another embodiment at least about 15%, although the amount can be outside of these ranges.

Ink Preparation

The ink compositions can be prepared by any desired or suitable method. For example, each of the components of the ink carrier can be mixed together, followed by heating the mixture to at least its melting point. The colorant may be added before the ink ingredients have been heated or after the ink ingredients have been heated. The molten mixture may optionally be subjected to grinding in an attritor, ball mill or media mill apparatus, or to high shear mixing, in order to effect dispersion of the colorant in the ink carrier. The heated mixture is then stirred to obtain a uniform molten ink, followed by cooling the ink to ambient temperature. The inks are solid at ambient temperature.

Ink Properties

The melting and crystallization temperatures of the phase change ink compositions can be determined by differential scanning calorimetry (DSC), with, for example, a TA Instruments Q100 apparatus, using a heating and cooling temperature gradient of 10° C. per minute and measuring the crystallization temperature after a second repeat cycle of heating and cooling (to remove thermal history of the sample). The melting and crystallization temperatures of the phase change ink compositions can also be determined by dynamic rheology (with, for example, a Rheometrics RFS3 strain-controlled rheometer, using a 25 mm parallel plate geometry tool), with a gradient of 5° C. temperature steps every 90 seconds, while cooling the ink sample from an initial high temperature, such as about 140° C., to about 40° C., under a constant oscillating frequency of about 1 Hz and applied strain of about 100%.

The ink compositions in one embodiment have peak melting points, as measured by DSC methods, of no lower than about 60° C., in another embodiment no lower than about 70° C., in yet another embodiment no lower than about 75° C., and in still another embodiment no lower than about 80° C., and have melting points in one embodiment no higher than about 120° C., in another embodiment no higher than about 115° C., and in yet another embodiment no higher than about 110° C., although the peak melting point can be outside of these ranges.

The ink compositions in one embodiment have onset crystallization temperatures, as measured by the dynamic rheology method, of no lower than about 50° C., in another embodiment of no lower than about 55° C., and in yet another embodiment of no lower than about 60° C., and have onset crystallization temperatures in one embodiment of no higher than about 110° C., in another embodiment of no higher than about 105° C., and in yet another embodiment of no higher than about 100° C., although the onset crystallization temperature can be outside of these ranges.

The ink compositions generally have melt viscosities at a suitable jetting temperature (in one embodiment no lower than about 90° C., in another embodiment no lower than about 95° C., and in yet another embodiment no lower than about 100° C., and in one embodiment no higher than about 150° C., and in another embodiment no higher than about 140° C., although the jetting temperature can be outside of these ranges) in one embodiment of no more than about 20 centipoise, in another embodiment of no more than about 18 centipoise, and in yet another embodiment of no more than about 15 centipoise, and in one embodiment of no less than about 5 centipoise, in another embodiment of no less than about 7 centipoise, and in yet another embodiment of no less than about 9 centipoise, although the melt viscosity can be outside of these ranges. In another specific embodiment, the inks have viscosities of from about 7 to about 15 centipoise at temperatures of about 110, 120, and/or 130° C.

The phase change ink compositions generally have peak viscosities at the end of their crystallization (solidification) phase transition (in one embodiment no lower than about 40° C., in another embodiment no lower than about 50° C., and in yet another embodiment no lower than about 60° C., and in one embodiment no higher than about 120° C., and in another embodiment no higher than about 110° C., although the solidification endpoint temperature can be outside of these ranges) in one embodiment of no more than about $1\times10^9$ centipoise, and in another embodiment of no more than about $1\times10^8$ centipoise, and in one embodiment of no less than about $1\times10^7$ centipoise, and in another embodiment of no less than about $1\times10^6$ centipoise, although the peak viscosity value can be outside of these ranges.

The hardness of the phase change ink is a characteristic that can serve as an indicator of ink robustness on the printed image (for example, resistance to abrasion, folding creases, or the like). The ink hardness can be measured using a needle penetrometer apparatus, such as the PTC® Durometer Model PS 6400-O-29001 (available from Pacific Transducer Corp., USA) equipped with a Model 476 Stand with standard 1 Kg load. In this Durometer apparatus, a sharp tip (or needle) mounted within a retractable post is pressed against the surface of a molded sample of ink. The degree of resistance to the needle tip upon pushing down on the ink surface is measured and correlated to the distance by which the needle tip has retracted backward into the mounting post. A measured value of 100 would indicate a perfectly hard and impermeable surface (such as glass).

The inks disclosed herein have hardness values, measured at about 25° C. using the PTC® Durometer, of in one embodiment at least about 60, in another embodiment at least about 65, in yet another embodiment at least about 70, in still another embodiment at least about 75, and in yet still another embodiment at least about 80, although the value can be outside of these ranges.

Printing Processes

The inks can be employed in an apparatus for ink jet printing processes either directly to paper, or indirectly to an intermediate transfer member. Examples of apparatus that are suitable for printing the inks described herein include apparatus comprising at least one thermally controlled ink retaining reservoir to store or hold molten phase-change ink, an ink jet head for printing the ink, and an ink supply line for providing the phase-change ink to the ink jet head.

Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. Known direct printing process may be suitable for applying the ink compositions of the present disclosure onto a substrate.

Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, or the like. Phase-change inks as disclosed herein can also be used in printing processes other than hot melt ink jet printing processes, such as hot-melt lithographic, flexographic, and related offset ink printing processes.

Any suitable substrate or recording sheet can be employed, such as plain paper, including XEROX® 4024 papers, XEROX® Image Series papers, Courtland 4024 DP paper, ruled notebook paper, bond paper, coated papers such as Sharp Company silica coated paper, Xerox® Digital Color Elite Gloss paper, JuJo paper, HAMMERMILL LASERPRINT® paper, heavy paper stocks or the like, and transparency materials, fabrics, textile products, plastics, flexible polymeric films, inorganic substrates such as metals or silicon wafers, wood, or the like.

Specific embodiments will now be described in detail. These examples are intended to be illustrative, and the claims are not limited to the materials, conditions, or process parameters set forth in these embodiments. All parts and percentages are by weight unless otherwise indicated.

Example I

Synthesis of Butane-1,4-Trans-Cinnamate

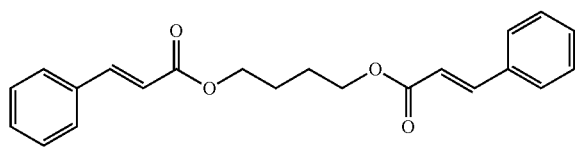

To a 3-neck 500 mL round-bottomed flask equipped with a dean stark trap and condenser, thermocouple, and argon inlet was added trans-cinnamic acid (100 g, 674 mmol, obtained from Sigma-Aldrich), 1,4-butanediol (30.4 g, 337 mmol, obtained from Sigma-Aldrich), and FASCAT 4201 dibutyl tin oxide catalyst (0.12 g, 0.1 wt %, obtained from Arkema Inc.). The mixture was slowly heated under argon to 120° C., during which time the trans-cinnamic acid melted. The temperature was then raised to 180° C., and condensation began around 150° C. The reaction mixture was stirred at 180° C. overnight (~20 h). Thereafter, vacuum (1-2 mm-Hg) was applied for ~20 min. A total of 5.3 mL water was collected in the dean stark trap. The reaction mixture was cooled under argon to ~100° C. and discharged into an aluminum tray and cooled to room temperature to give 110 g of product as an off-white solid. The product was transferred to a 500 mL Erlenmeyer flask, to which was added ~125 mL isopropyl alcohol heated to ~85° C., during which the product dissolved. The flask was then cooled to room temperature, during which product crystallized out, was filtered, and dried in a vacuum oven at 60° C. overnight to give 90 g product as an off-white solid (79% yield). The product was shown to be pure by NMR. $T_{melt}$(DSC)=95° C.; $T_{cryst}$(DSC)=76° C.; $T_{cryst}$(rheology)=87° C.

Example II

Synthesis of Propane-1,3-Trans-Cinnamate

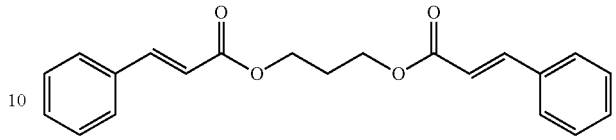

The process of Example I was repeated except that 1,3-propanediol was used instead of 1,4-propanediol. $T_{melt}$(DSC)=89.9° C.; $T_{cryst}$(DSC)=72° C. (measured with DSC at 5° C./minute).

Example III

Ink Preparation and Testing

Into a 30 mL glass vessel was charged, in the following order: 3.6 g butane-1,4-trans-cinnamate (72 wt %), 1.0 g PICOLYTE F90 (20 wt %), and 0.25 g pentaerythritol tetrastearate. The materials were melted at 130° C. for 1 h, after which was added 0.13 g Orasol Blue GN dye (3 wt %, obtained from CIBA (now BASF)) to the molten mixture. The colored ink mixture was then heated at 130° C. while stirring at 300 rpm for an additional 2.5 h. The dark blue molten ink was then poured into a mold and cooled at room temperature to solidify and form Ink 1.

The process was repeated with the ingredients shown in the table below to form Inks 2, 3, and 4. Ink hardness was measured by pouring each ink into a brass mold to prepare a 5 g disk sample ~5 mm thick. The ink hardness was evaluated by needle penetrometer test (using a Durometer instrument) where the needle tip impacted the surface of the ink disk at a 90° incident angle (normal to the ink disk surface), wherein a value of 100% hardness indicates an impenetrable surface (hard metal, glass, etc.). Viscosity values were measured with a Rheometrics RFS3 instrument, using a 25 mm parallel plate geometry tool, constant frequency of 1 Hz, and applied strain of 200-400%, over a temperature range of 140° C. to about 60° C.

| | Component | Ink 1 | Ink 2 | Ink 3 | Ink 4 |
| --- | --- | --- | --- | --- | --- |
| | | wt (%) | | | |
| Phase-Change Agent | butane-1,4-trans-cinnamate (25% BRC) | 70% | 72% | 72% | 70% |
| Amorphous Binder Resin | PICOLYTE F90 (100% BRC) | 20% | 20% | 20% | |
| | PICOLYTE S85 (100% BRC) | | | | 20% |
| Viscosity Modifier | SPAN 65 (sorbitan tristearate esters) (100% BRC) | | 5% | | |
| | pentaerythritol tetrastearate (89% BRC) | 7% | | | |
| | SISTERNA A10E-C (92% BRC) | | | 5% | |
| | MONTELLO DK-Ester F-20W (100% BRC) | | | | 5% |
| Colorant | Orasol Blue GN dye | 3% | 3% | 3% | 5% |
| Total | | 100% | 100% | 100% | 100% |
| *BRC (%) | | 43.7% | 43% | 43% | 43% |

-continued

| | Component | Ink 1 | Ink 2 | Ink 3 | Ink 4 |
| | | | wt (%) | | |
|---|---|---|---|---|---|
| Ink Properties | *Viscosity @130° C. (cPs) | 10.46 | 10.07 | 10.45 | 13.80 |
| | *Peak Viscosity (cPs) | $3.1 \times 10^7$ | $2.07 \times 10^7$ | $3.9 \times 10^7$ | $2.55 \times 10^7$ |
| | Tcryst. (° C.) (by rheology) | 71 | 72 | 72 | 76 |
| | **Ink Hardness (Average) | 81 | 88 | 86 | 87 |

The rheology profiles for Inks 1 through 4 (complex viscosity in centipoise vs. temperature in ° C.) are shown in FIG. 1.

Ink 2 was printed onto Xerox Digital Color Elite Gloss coated papers (120 gsm stock) using a K-proofer gravure printing plate rigged with a pressure roll set at low pressure. The gravure plate temperature controller was set at 142° C., but the actual plate temperature was ~134° C. Image robustness of the K-proofed ink print was evaluated using a "coin" scratch test. The test looked at how much ink was removed from the coating after a "coin" tool with a beveled edge was run across the surface. For this test a modified Taber Industries Linear Abraser (Model 5700) with a custom "coin" scratch tip was used. The scratch attachment (mass of the "coin" holder, scratch tip, mounting) was 100 g and was lowered onto the test sample, which was then scratched for either 3 cycles or 9 cycles with a frequency of 25 cycles/minute. A two inch long scratch was examined to see what damage had occurred to the print. The amount of material removed from the coated paper was then measured by first scanning along the scratch length using a flat bed scanner. Commercial image analysis software converted the pixel count to a unit-less measurement CA (crease area). White areas in the scratch zone (i.e. areas where ink had been removed from the substrate by the scratch tip) were counted. Higher pixel counts corresponded to more ink being removed from the print and showing more damage. A perfect non-scratched ink print had no material being removed and therefore had very low pixel count (and CA) approaching zero.

The data in the table below show the CA values (which are directly proportional to pixel count) for the scratched areas of the K-proof ink prints generated by the coin tester. Ink 2 demonstrated significantly better scratch resistance than a comparative commercial phase change ink. Ink 2 did not show any significant ink removal when scratched using the instrument.

| Ink | Coin Scratch 9 Cycles (CA) |
|---|---|
| Comparative commercial ink | 105 |
| Ink 2 | 0 |

It is believed that incorporation of Inks 1 through 4 into a modified XEROX® PHASER 8860 printer will result in the generation of prints onto Digital Color Elite Gloss, 120 gsm (DCEG) and Xerox Business 4200 (75 gsm) papers, forming robust images that cannot be easily removed from the substrates.

Example IV

The processes of Example III are repeated except that the propane-1,3-trans-cinnamate prepared in Example II is used instead of the butane-1,4-trans-cinnamate prepared in Example I. It is believed that similar results will be obtained.

Example V

The processes of Example III are repeated except that hexane-1,6-trans-cinnamate, prepared by a process similar to that of Examples I and II, is used instead of the butane-1,4-trans-cinnamate prepared in Example I. It is believed that similar results will be obtained.

Example VI

The processes of Example III are repeated except that trans-cyclohexane-1,4-dimethanol-trans-cinnamate, prepared by a process similar to that of Examples I and II, is used instead of the butane-1,4-trans-cinnamate prepared in Example I. It is believed that similar results will be obtained.

Example VII

The processes of Example III are repeated except that para-phenyl 1,4-dimethanol-trans-cinnamate, prepared by a process similar to that of Examples I and II, is used instead of the butane-1,4-trans-cinnamate prepared in Example I. It is believed that similar results will be obtained.

Example VIII

The processes of Example III are repeated except that bis(hydroxymethyl)furan-trans-cinnamate, prepared by a process similar to that of Examples I and II, is used instead of the butane-1,4-trans-cinnamate prepared in Example I. It is believed that similar results will be obtained.

Example IX

The processes of Example III are repeated except that 2,5-dihydroxymethyl-tetrahydrofuran-trans-cinnamate, prepared by a process similar to that of Examples I and II, is used instead of the butane-1,4-trans-cinnamate prepared in Example I. It is believed that similar results will be obtained.

Example X

The processes of Example III are repeated except that trans-cinnamic acid-2,3-butanediol diester, prepared by a process similar to that of Examples I and II, is used instead of the butane-1,4-trans-cinnamate prepared in Example I. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising an ink carrier which comprises
    (a) a crystalline trans-cinnamic diester selected from the group consisting of trans-cyclohexane-1,4-dimethanol-trans-cinnamate, para-phenyl-1,4-dimethanol-trans-cinnamate, bis(hydroxymethyl)furan-trans-cinnamate, 2,5-dihydroxymethyl-tetrahydrofuran-trans-cinnamate, trans-cinnamic acid-2,3-butanediol diester, and a mixture thereof; and
    (b) an amorphous polyterpene resin.

2. An ink according to claim 1 wherein the trans-cinnamic diester is present in the ink carrier in an amount of from 50 to 95 percent by weight.

3. An ink according to claim 1 wherein the polyterpene resin contains monomers selected from alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof.

4. An ink according to claim 1 wherein the polyterpene resin is on an α-pinene/β-pinene copolymer, a β-pinene polymer, a limonene polymer, or a mixture thereof.

5. An ink according to claim 1 wherein the polyterpene resin is present in the ink carrier in on amount of from 5 to 50 percent by weight.

6. An ink according to claim 1 further containing a viscosity modifier.

7. An ink according to claim 6 wherein the viscosity modifier is a sorbitol ester, a pentaerythritol ester, or a mixture thereof.

8. An ink according to claim 6 wherein the viscosity modifier is pentaerythritol tetrastearate, pentaerythritol tetrabenzoate, a sorbitan tristearate ester, stearyl stearamide, erucamide, stearone, sucrose tetrastearate, sucrose tetrastearate triacetate, an ester of the formula:

wherein $R_1$, $R_2$, and $R_3$ each, independently of the others, are hydrogen atoms or alkyl chains derived from saturated fatty acids, or a mixture thereof.

9. An ink according to claim 6 wherein the viscosity modifier is present in the ink in on amount of from 0.5 to 15 percent by weight of the ink.

10. An ink according to claim 1 having a hardness value of at least 70 as measured at 25° C.

11. An ink according to claim 1 having a peak melting point, as measured by DSC, of from 60 to 120° C.

12. An ink according to claim 1 wherein the ink carrier has a bio-renewable content of at least 10%.

13. An ink according to claim 1 having a crystallization temperature, as measured by differential scanning calorimetry, of from 65 to 150° C.

14. An ink according to claim 1 wherein the polyterpene resin contains monomers selected from alpha-pinene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof.

15. An ink according to claim 6 wherein the viscosity modifier is a sorbitol ester.

16. An ink according to claim 1 wherein the trans-cinnamic diester is trans-cyclohexane-1,4-dimethanol-trans-cinnamate.

17. An ink according to claim 1 wherein the trans-cinnamic diester is para-phenyl-1,4-dimethanol-trans-cinnamate.

18. An ink according to claim 1 wherein the trans-cinnamic diester is bis(hydroxymethyl)furan-trans-cinnamate.

19. An ink according to claim 1 wherein the trans-cinnamic diester is 2,5-dihydroxymethyl-tetrahydrofuran-trans-cinnamate.

20. A phase change ink comprising:
    (1) an ink carrier comprising:
        (a) a crystalline trans-cinnamic diester in an amount of from 50 to 95 percent by weight, wherein said trans-cinnamic diester is trans-cinnamic acid-2,3-butanediol diester; and
        (b) an amorphous polyterpene resin in an amount of from 5 to 50 percent by weight, said polyterpene resin

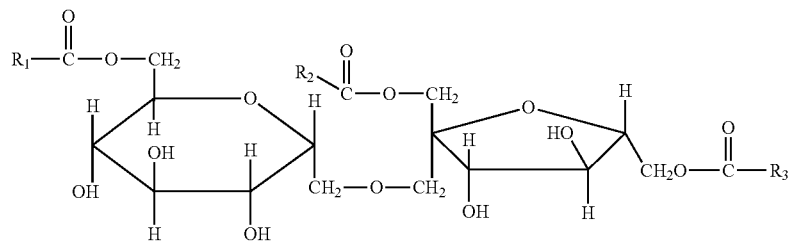

containing monomers selected from alpha-pinene, beta-pinene, limonene, norbornene, myrcene, phellandrene, carvone, camphene, 2-carene, 3-carene, perillyl alcohol, perillyl aldehyde, perillic acid, alkyl esters of perillyl alcohol, aryl esters of perillyl alcohol, arylalkyl esters of perillyl alcohol, alkylaryl esters of perillyl alcohol, α-ionone, β-ionone, γ-terpinene, β-citronellene, β-citronellol, citronellal, citronellic acid, alkyl esters of β-citronellol, aryl esters of β-citronellol, arylalkyl esters of β-citronellol, alkylaryl esters of β-citronellol, geraniol, geranial, alkyl esters of geraniol, aryl esters of geraniol, arylalkyl esters of geraniol, alkylaryl esters of geraniol, linalool, alkyl esters of linalool, aryl esters of linalool, arylalkyl esters of linalool, alkylaryl esters of linalool, nerolidol, alkyl esters of nerolidol, aryl esters of nerolidol, arylalkyl esters of nerolidol, alkylaryl esters of nerolidol, verbenol, verbenone, alkyl esters of verbenol, aryl esters of verbenol, arylalkyl esters of verbenol, alkylaryl esters of verbenol, and mixtures thereof; and (2) a colorant.

* * * * *